Figures 1, 2:
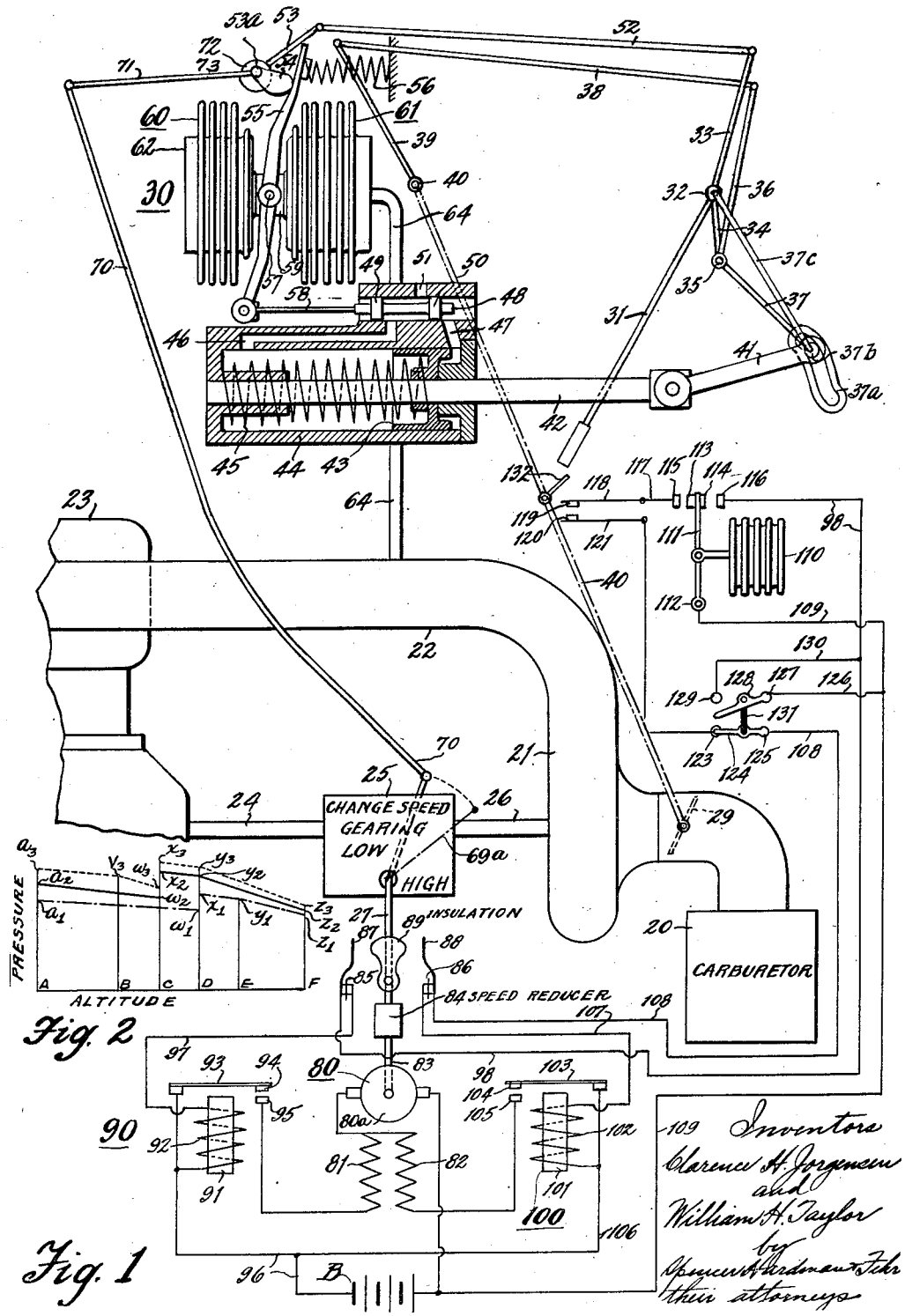

June 12, 1951  C. H. JORGENSEN ET AL  2,556,190

POWER PLANT

Filed March 22, 1943

Inventors
Clarence H. Jorgensen
and
William H. Taylor
by
Spencer Hardman Ihr
their attorneys Patented June 12, 1951

2,556,190

UNITED STATES PATENT OFFICE 2,556,190

POWER PLANT

Clarence H. Jorgensen and William H. Taylor, Anderson, Ind., assignors to General Motors Corporation, Detroit, Mich., a corporation of Delaware Application March 22, 1943, Serial No. 480,034

15 Claims. (Cl. 123—103)

This invention relates to the control of an airplane engine which drives its supercharger through change-speed gearing. It is an object of the invention so to control the engine and supercharger that an ascent can be made to high altitude in the minimum time while protecting the engine against such over-boosting of the fuel intake pressure as would quickly cause destruction of the engine. During ascent in the lower altitude range the supercharger is driven by the engine at a certain low relative speed, thus restricting the power output to the supercharger to a low value and making more power output available to the propeller. During ascent in the high altitude range, the supercharger is driven by the engine at a certain high relative speed in order to maintain such fuel intake pressure as will enable the engine to develop its maximum rated power until a critical altitude is reached which is substantially higher than the critical altitude for the pressure originally selected for the ascent with low-speed supercharger operation. The change from low-speed supercharger operation to high-speed supercharger operation is accompanied by a boost in pressure commensurate with the increase in horse-power required to operate the supercharger at higher speed. Thus, the power available to the propeller will be the same after the change in supercharger speed as existed before this change. Precaution must be taken that the boost in fuel intake pressure does not raise the pressure to such value that the engine is over-boosted and the pressure of combustion destroys the engine. Therefore the change from low-speed to high-speed operation of the supercharger must come at an altitude which is higher than the altitude which is critical for the maximum pressure selected for the take-off with low-speed supercharger operation in order to allow the pressure to diminish before speed-increase to such lower value that, when the pressure is boosted concurrently with the speed-increase, the horsepower output to the propeller after the shift will be substantially the same as the horsepower just before the shift. The altitude which is safe for shift to high gear when the pressure preselected for ascent is maximum obviously will be safe for lower pressure selections.

To accomplish this object, the engine throttle valve and the supercharger change-speed gearing are under a coordinated control provided by an engine intake fuel pressure regulator having manually operable means for selecting various pressures to be maintained and having means responsive to the shifting of the change-speed gearing into high for boosting the selected pressure and provided by altitude responsive means which will not effect the shift into high gear until at least that altitude is attained which is safe for shift when maximum take-off pressure had been pre-selected. In case the pre-selected pressure to be maintained by the supercharger is of such low value that the critical altitude for that pressure selected with low-speed supercharger operation exceeds the safe-for-shift altitude, there is no need to shift at the safe-for-shift altitude as the engine does not begin to lose power until the higher, critical altitude is reached. Therefore the shift must be deferred until the higher, critical altitude is reached. Consequently, the gear-shift mechanism is under the joint control of an aneroid which performs a function at the safe-for-shift altitude and the engine pressure regulator which performs a function when the throttle has been moved to wide-open position. Both of these controlling functions must have been performed before shifting into high gear is effected. This coordinated control must also provide that when the supercharger gearing has been shifted into high, it shall remain in high gear as long as the altitude is at least as great as the safe-for-shift altitude.

In the disclosed embodiment of the present invention there is a reversible electric servo-motor which operates a shaft in either direction for the purpose of shifting the gearing connecting the engine with the supercharger from low to high when the safe-for-shift altitude is reached and when the throttle valve opens to a certain extent. The motor has two fields wound for opposite polarity. The fields are controlled by two relays. An aneroid closes a switch when the safe-for-shift altitude is reached and that switch is in series with a switch which is closed only when the regulator has operated to open the throttle valve to predetermined extent. When both said switches are closed one of the relays operates to render the motor operative to shift the gearing from low to high. When the airplane descends slightly below the safe-for-shift altitude, the aneroid opens the first mentioned switch and closes another switch which causes the other relay to be energized to cause the motor to operate to shift the gearing from high to low. A manually operated switch is provided for effecting motor operation to shift from high to low whenever desired.

Further objects and advantages of the present invention will be apparent from the following description, reference being had to the accompanying drawings wherein a preferred embodiment of the present invention is clearly shown.

In the drawings:

Fig. 1 of the drawings is a diagram of an embodiment of the present invention.

Fig. 2 is a chart showing the relation of altitudes and intake pressure.

According to Fig. 1, a carburetor 20 supplies combustible mixture to inlet of a supercharger 21 whose outlet is connected by pipe 22 with the intake ports of an engine 23. Engine 23 drives a shaft 24 connected by change speed gearing 25 with a shaft 26 which drives the supercharger 21. Gearing 25 is in low speed condition when a lever 69 driven by a gear-shift operating shaft 27 is in the low position shown. If lever 69 is moved clockwise to high position 69a, the gearing 25 is in high speed condition and supercharger runs at a rate relative to engine speed which is higher than when lever 69 is in low speed position.

The rotatable shaft 27 is under the joint control of an aneroid 110 and a throttle valve regulator 30 which determines the extent of opening of a throttle valve 29 in the duct between carburetor 20 and supercharger 21.

The regulator 30 has a main control lever 31 which is manually operated from the pilot's seat. Lever 31 is pivoted at 32 and operates arms 33 and 34. Arm 34 carries the fulcrum 35 for bellcrank lever arms 36 and 37. Arm 36 is connected by link 38 with arm 39 attached to shaft 40 attached to throttle valve 29. Arm 37 has a cam slot 37a which receives a cam follower roller 37b carried by a link 41 connected with the piston rod 42 of an hydraulic servo-motor having a piston 43 slidable in a cylinder 44 and urged toward the right by a spring 45. Roller 37b is connected also with an arm 37c pivotally supported at 32. Cylinder 44 has ports 46 and 47 controlled by a valve 48 having lands 49 and 50 capable of covering both ports 46 and 47 simultaneously, or of placing pressure fluid inlet 51 in communication with either one of these ports.

Arm 33 is connected by link 52 with an arm 53 connected with shaft 53a for rotating a pressure selecting cam 54 against which a lever 55 is urged by a spring 56. Lever 55 is fulcrumed at 57 and is connected by rod 58 with valve 48. Fulcrum 57 is supported by bridge 59 connecting the free ends of metal bellows 60 and 61 having their ends 62 and 63, respectively, fixed. Bellows 60 is sealed and evacuated. Bellows 61 is connected by pipe 64 with the fuel duct 22. The bellows 60 and 61 contain springs not shown which are so calibrated that fulcrum 57 moves in a predetermined relation to changes in engine intake pressure.

The normal position of the piston rod 42 is shown. Movement of lever 31 counterclockwise from the idle position shown causes an opening movement of throttle 29 and a counterclockwise movement of cam 54 thereby causing lever 55 to locate valve 48 so that pressure fluid inlet 51 communicates with cylinder port 47. Then rod 42 moves left to effect whatever further opening movement of throttle valve 29 is required to maintain the fuel intake pressure selected by cam 54 when moved from its normal position by movement of lever 31 counterclockwise. When the selected pressure is attained, bellows 61 will have expanded to an extent such that fulcrum 57 moves to cause valve 48 to be placed in position for closing both ports 46 and 47 of cylinder 44. As the altitude increases, rod 42 will move further and further toward the left to cause the selected pressure to be maintained. Critical altitude for a selected pressure is attained when the piston 43 has moved to the limit of travel toward the left, so that opening movement of the throttle valve 29 ceases. The lengths and locations of the levers and the shape of the cam slot 37b of the regulator are such that the throttle valve 29 can be moved by the piston 43 to wide open position for pressure selections over a relatively wide range, as from minimum cruise to emergency. This feature is disclosed in detail in the copending application of Jorgensen and Taylor, S. N. 483,438, filed April 17, 1943, and now abandoned.

The pressure selected by the location of cam 54 is gradually reduced as altitude increases due to the fact that the area of bellows 60 subjected to atmospheric pressure is less than the area of bellows 61. The difference in area is such that, at critical altitude for low relative speed operation of the supercharger, the selected pressure has dropped a few percent from the selected ground level pressure. This drop in pressure is allowed because the engine exhaust back pressure decreases as altitude increases.

When a certain altitude is reached which is critical for a certain selected pressure with low-speed blower operation, the rod 42 will have moved to its extreme left position and the throttle valve 29 will be wide open. That altitude is called critical because, if exceeded, the fuel intake pressure decreases rapidly and the engine loses power. The higher the pressure selection, the lower will be the critical altitude and vice-versa. Therefore means responsive to a predetermined altitude and to a function of regulator 30 are provided for increasing the speed of supercharger 21 so that higher altitudes can be reached without loss of power.

The means for controlling the speed of the supercharger 21 comprises a reversible electric servo-motor 80 having fields 81 and 82 wound for opposite polarity. Motor 80 drives a shaft 83 connected by speed reducing gearing 84 with the gear-shift operating shaft 27. Shaft 27 drives a nonconducting arm 89 for engaging either of two blades 87 and 88 which are normally biased to positions for closing, respectively, the pairs of limit-switch contacts 85 and 86.

The operation of motor 80 with field 81 energized to cause counterclockwise rotation of shaft 27 to change the status of gearing 25 from high to low is controlled by a relay 90 having a core 91 surrounded by a coil 92 connected by wire 96 with battery B and by wire 97 with limit switch contacts 85. When coil 92 is energized an armature 93 moves down to close contacts 94 and 95 thereby placing the motor armature 80a and the field 81 in series with the battery B.

The operation of motor 80 with field 82 energized to cause clockwise rotation of shaft 27 to change the status of gearing 25 from low to high is controlled by a relay 100 having a core 101 surrounded by a coil 102 connected by wire 106 with wire 96 and with battery B, and by wire 107 with limit switch contacts 86. When coil 102 is energized an armature 103 moves down to close contacts 104 and 105 thereby placing the motor armature 80a and the field 82 in series with the battery B.

Wires 98 and 108 lead respectively from limit switch blades 87 and 88. Wire 109 is connected with battery B and with pivot 112 of an arm 111 operated by aneroid 110. Arm 111 carries contacts 113 and 114 engageable respectively with contacts 115 and 116. Contact 116 is connected with wire 98. Contact 115 is connected by wire 117 with blade 118 carrying a contact 119 engageable with a contact 120 on a blade 121 connected by wire 122 with a contact 123 engaged by a movable contact 124 pivoted at 125 and connected with wire 108. Contact 129 is engageable with a movable contact 128 pivoted at 127 and connected by wire 126 with wire 109. Contact 129 is connected by wire 130 with wire 98. When automatic control of supercharged speed is desired, switch contacts 124 and 128 are in the position shown in the drawing. Contacts 124 and 128 are mechanically connected by a nonconducting bar 131 which can be moved manually upwardly when it is desired to effect a manual control of gear shifting.

When a predetermined altitude is reached which is the safe-for-shift altitude for all pressure selections for which the regulator is set, with the supercharger gearing in low speed, the aneroid 110 will have expanded and closed switch 113, 115. When the regulator 30 has moved the throttle valve 29 to a substantially wide open position, an arm 132 on shaft 40 will have so moved as to engage blade 118 and to cause contact 119 to engage contact 120. Then the battery B will be in series with relay coil 102, limit switch contacts 86 and closed switches 124—123, 120—119 and 115—113. The motor 80 will turn the shaft 27 clockwise to shift the gearing 25 from low to high. Rotation of shaft 27 in a clockwise direction stops when arm 89 causes separation of contacts 86. Then the supercharger 21 operates at a higher relative speed to increase the fuel intake pressure so that higher altitude can be reached without substantial loss of power.

When the altitude decreases slightly below the safe-for-shift altitude, the aneroid collapses sufficiently to open contacts 115—113 and to close contacts 114—116. Then relay coil 92 is connected in series with the battery B and with limit switch contacts 85 and with contacts 114—116. Then motor 80 rotates the shaft 27 counterclockwise to change the gearing 25 from high to low. Counterclockwise rotation of shaft 27 ceases when arm 89 causes separation of contacts 85.

If it is desired to shift the gearing 25 from high to low while the altitude is at or above the safe-for-shift altitude the bar 131 is manually moved to disconnect contact 124 from contact 123 and to connect contact 128 with contact 129.

The lever 69, which is operated by gear-shift operating shaft 27, is connected by a link 70 with a lever 71 which rotates a shaft 72 having its axis 73 below the axis of selector cam shaft 53a which is supported by shaft 72. When shaft 27 is rotated clockwise to shift the change speed gearing 25 into high gear condition, shaft 72 is rotated counterclockwise to cause cam 54 to move toward the left to allow spring 56 to move lever 55 counterclockwise. This so modifies the operation of the regulator as to cause it to maintain an intake pressure which is greater than the pressure which existed at critical altitude before the gearing 25 was shifted into high. Increase of intake pressure causes the engine to develop additional power required to operate the supercharger at high relative speed.

The airplane can now climb to greater altitudes without loss of power until that altitude is reached which is critical for the selected pressure with the supercharger operating at high relative speed. The shift into high gear is made only when at least the safe-for-shift altitude has been reached and when the throttle has been moved by the regulator into wide-open position. Once the supercharger gearing has been shifted into high gear, it remains in high gear so long as at least the safe-for-shift altitude is maintained although the throttle may be partly closed, because the motor 80 stops when the limit switch contacts 86 separate. The partial closing of the throttle and opening of contacts 119, 120 has no effect. When switches 124 and 128 remain in the position shown for automatic control, only the opening of switch 113, 115 and the closing of switch 114, 116, when the altitude is slightly lower than said safe-for-shift altitude, will cause the motor to turn shaft 27 counterclockwise to effect shifting of the gearing from high to low. Return to low gear may be effected manually by moving member 131 upwardly to disconnect blade 124 from contact 123 and to connect blade 128 with contact 129.

This system of control provides for automatically maintaining an engine power output required for rapid ascent into high altitudes, but without burdening the engine with high speed operation of the supercharger until it is necessary to operate it at high speed to reach the desired high altitude without loss of power. Furthermore the engine is protected against overboosting by withholding the shift and the increase of pressure selection until at least a safe-for-shift altitude is attained.

Fig. 2 shows examples of pressure control starting at ground level, altitude A, with different selected pressures $a_1$, $a_2$, or $a_3$. The aneroid 110 is designed to close contacts 113, 115 at safe-for-shift altitude C. Take first the case when C is also the altitude which is critical for a certain selected pressure $a_2$ with low speed supercharger operation. Pressure $a_2$ is, for example, suitable for normal cruise. The pressure $a_2$ droops gradually to $w_2$ at altitude C while horsepower output to the propeller remains practically constant. At altitudes higher than C the pressure would decrease rapidly because piston 43 already had moved left to the limit of travel and the throttle had fully opened. Therefore at altitude C, the supercharger gearing is shifted into high as the result of substantially concurrent closing of switch 119, 120 and switch 113, 115. At altitude C, the supercharger rotates faster and the pressure increases to $x_2$ which exceeds $a_2$ by an amount commensurate with the increased power required to operate the supercharger at increased speed, thus leave horsepower output to the propeller the same as before shift. Pressure $x_2$ falls gradually to $y_2$ at altitude D which is critical for that pressure. Then the pressure decreases more rapidly from $y_2$ to $z_2$ at altitude F.

Another example is when safe-for-shift altitude C is higher than the critical altitude for a selected pressure. The pressure selected at ground level A is pressure $a_3$, suitable for take off, which droops to $v_3$ at altitude B which is critical for that pressure. The servo-piston 43 has moved fully left to the limit and the switch 119, 120 is closed; but there is no shift of the supercharger gearing because safe-for-shift altitude C has not been reached, switch 113, 115 being still open. At altitude C, the pressure has fallen to $w_3$. Then the supercharger gearing is shifted into high upon the closing of switch 113, 115. The pressure rises to $x_3$, which is in excess of $a_3$ but still safe for the engine, and droops to $y_3$ at altitude D which is critical for that pressure.

Then the pressure falls more rapidly to $z_3$ at altitude F.

Another example is when safe-for-shift altitude C is lower than the critical altitude for a selected pressure. The pressure selected at ground level is $a_1$, below normal cruising pressure, which droops to $w_1$ at about altitude D which is critical for that pressure. When altitude C has been attained switch 113, 115 closes, but no shift of the supercharger gearing took place because piston 43 had not moved fully left and switch 119, 120 had not closed. At altitude D, the servo-motor piston 43 had moved fully left and switch 119, 120 had closed. Then the gearing was shifted into high and the pressure rises to $x_1$ which exceeds $a_1$. The pressure droops from $x_1$ to $y_1$ at altitude E which is critical for that pressure. Then the pressure falls more rapidly to $z_1$ at altitude F.

Once the change speed gearing has been shifted into high the gearing will remain in high so long as the altitude is at least C, the safe-for-shift altitude. It follows that, if the pressure selections are such that the critical altitudes for low gear operation are C or less, the pressure changes during descent from F to A are substantially the same as ascent from A to F. The only difference is due to the fact that shift back into low gear takes place at an altitude slighty lower than C. But, if the pressure selections are such that critical altitudes for low gear operation are in excess of C, the pressure changes during descent from F to A are not all the same as during ascent from A to F. For example, if $a_1$ has been the pressure selected for operation at altitude A, in descending from F, the pressure would not fall from $x_1$ to $w_1$ at altitude D, because there would be no shifting back into low gear at altitude D. In descending from D to C the pressure would rise above $x_1$ for example to a pressure between $w_2$ and $w_3$, and then the shift would be made into low at an altitude slightly less than C, and the pressure would fall to the $a_1$—$w_1$ line.

While the embodiment of the present invention as herein disclosed constitutes a preferred form, it is to be understood that other forms might be adopted, all coming within the scope of the claims which follow.

We claim:

1. A power plant for aircraft comprising an internal combustion engine having a fuel intake, a supercharger connected with the fuel intake, means for driving the supercharger by the engine including change speed gearing, a member for shifting the gearing and movable from a low-gear position to a high gear position, electrically operative means for moving the member, a throttle valve movable to control the intake pressure produced by the supercharger, an automatic pressure regulator for moving the throttle valve to maintain a selected pressure as the aircraft is operated at different altitudes, an aneroid, a circuit for causing the motor to operate in a direction to move said member from low-speed to high-speed position, a circuit for causing the motor to operate in a direction to move said member from high-speed to low-speed position, two switches in series for controlling the first mentioned circuit, means under the control of the aneroid for closing one of the switches when a predetermined altitude has been reached, means under the control of the regulator for closing the other of the switches when the throttle valve has reached a predetermined open position, and a switch for controlling the second mentioned circuit of the motor and closed by operation of the aneroid at pressure below said predetermined altitude.

2. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, means for controlling the operation of said electric motor including a circuit controlling means operated in response to atmospheric pressure and a second circuit controlling means operated by the pressure regulator.

3. A power plant for aircraft comprising an internal combustion engine having a fuel mixture intake a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, means for controlling the operation of said electric motor including a circuit controlling means operated in response to atmospheric pressure and a second circuit controlling means operated by the pressure regulator as it moves the throttle to a predetermined position.

4. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, means for controlling the operation of said electric motor including a circuit controlling means operated in response to atmospheric pressure and a second circuit controlling means operated by movement of the throttle to a predetermined position as said throttle is moved by the pressure regulator.

5. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, means for controlling the operation of said electric motor including a circuit controlling means operated in response to atmospheric pressure and a second circuit controlling means operated by movement of the throttle to wide open position as said throttle is moved by the pressure regulator.

6. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, circuits for controlling the operation of said electric motor and its direction of operation and a plurality of switches for controlling said circuits including a switch operated in response to altitude pressure, a second switch operated by the pressure regulator as the throttle is moved to a predetermined position and a third switch operable to control the effectiveness of the electric motor and direction of operation thereof.

7. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, circuits for controlling the operation of said electric motor and its direction of operation and a plurality of switches for controlling said circuits including a switch operated in response to altitude pressure, a second switch operated by the pressure regulator as the throttle is moved to a predetermined position and a third switch manually operable to control the effectiveness of the motor and the direction of rotation thereof.

8. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, means for controlling the operation of said electric motor including a circuit controlling means operated in response to atmospheric pressure, a second circuit controlling means operated by movement of the throttle to a predetermined position as said throttle is moved by the pressure regulator, and a plurality of switches operable to determine the extent of rotation of said motor in both directions.

9. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, circuits for controlling the operation of said electric motor and its direction of operation and a plurality of switches for controlling said circuits including a switch operated in response to altitude pressure, a second switch operated by the pressure regulator as the throttle is moved to a predetermined position, a third switch operable to control the effectiveness of the electric motor and direction of operation thereof and a plurality of switches operable to determine the extent of rotation of said motor in both directions.

10. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, automatic means for controlling said electric motor including circuits and a plurality of switches for opening and closing said circuits, one of said switches being operable in response to altitude pressure and movable to determine the direction of rotation of said motor, a second switch adapted to be closed by movement of the throttle to a predetermined position to render the motor effective and a third switch operable to render the automatic control means for the motor wholly ineffective.

11. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, automatic means for controlling said electric motor including circuits and a plurality of switches for opening and closing said circuits, one of said switches being operable in response to altitude pressure and movable to determine the direction of rotation of said motor, a second switch adapted to be closed by movement of the throttle to a predetermined position to render the motor effective, a plurality of limit switches operable to stop the motor after it has made the necessary amount of movement to shift said gearing from its low to high gear position or vice versa, and another switch operable to render the automatic control means for the motor wholly ineffective.

12. A power plant for aircraft comprising an internal combustion engine having a fuel mixture intake, a supercharger connected to said fuel mixture intake, means operable by the engine for driving the supercharger including a change gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, automatic means for controlling said electric motor including circuits and a plurality of switches for opening and closing said circuits, one of said switches being operable in response to altitude pressure and movable to determine the direction of rotation of said motor, a second switch adapted to be closed by movement of the throttle to a predetermined position to render the motor effective, another circuit which when closed causes the motor to operate to shift said gearing from high to low speed position and a third switch operable to close said last named circuit and to render said automatic control means ineffective.

13. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, automatic means for controlling said electric motor including circuits and a plurality of switches for opening and closing said circuits, one of said switches being operable in response to altitude pressure and movable to determine the direction of rotation of said motor, a second switch adapted to be closed by movement of the throttle to a predetermined position to render the motor effective, another circuit which when closed causes the motor to operate to shift said gearing from high to low speed position and a manually actuated third switch operable to close said last named circuit and to render said automatic control means ineffective.

14. A power plant for aircraft comprising an internal combustion engine having a fuel mixture intake a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, automatic means for controlling the operation of said electric motor including two circuits one of which when closed causes the motor to operate in a direction to shift the gearing to high speed position and the other of which when closed causes the motor to shift the gearing to low speed position, an aneroid, a switch operable by the aneroid to close both of said circuits, a third circuit which when closed causes the motor to move the gearing to low speed position and a manually operable switch for closing said third circuit.

15. A power plant for aircraft comprising an internal combustion engine having a fuel mixture intake, a supercharger connected to said fuel mixture intake, means operable by the engine for driving the supercharger including a change speed gearing shiftable to high and low speed positions, means for shifting said gearing from one position to another, a reversible rotary electric motor for actuating said gear shifting means in opposite directions, a throttle valve movable to different positions to control the intake pressure, an automatic regulator for variably positioning the throttle to maintain a selected pressure as the aircraft is operated at different altitudes, automatic means for controlling the operation of said electric motor including two circuits one of which when closed causes the motor to operate in a direction to shift the gearing to high speed position and the other of which when closed causes the motor to shift the gearing to low speed position, an aneroid, a switch operable by the aneroid to close both of said circuits, a third circuit which when closed causes the motor to move the gearing to low speed position and renders the automatic control means for said motor ineffective, and a manually operable switch for closing said third circuit.

CLARENCE H. JORGENSEN.
WILLIAM H. TAYLOR.

REFERENCES CITED

The following references are of record in the file of this patent:

UNITED STATES PATENTS

| Number | Name | Date |
|---|---|---|
| 2,106,237 | Bush | Jan. 25, 1938 |
| 2,214,100 | Claytor | Sept. 10, 1940 |
| 2,217,364 | Halford et al. | Oct. 8, 1940 |
| 2,313,205 | Potez | Mar. 9, 1943 |
| 2,358,363 | Truesdell | Sept. 19, 1944 |

FOREIGN PATENTS

| Number | Country | Date |
|---|---|---|
| 482,283 | Great Britain | of 1938 |
| 524,730 | Great Britain | of 1940 |